No. 12,039. Reissued Sept. 30, 1902.
I. L. LANDIS.
GATE.
(Application filed June 23, 1902.)
Fig. 1.
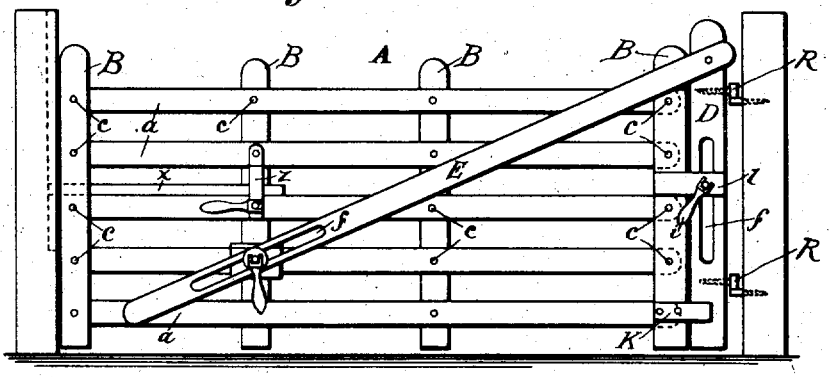
Fig. 2.
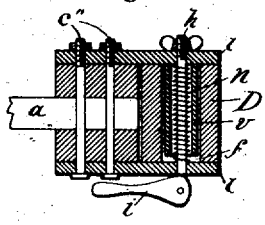
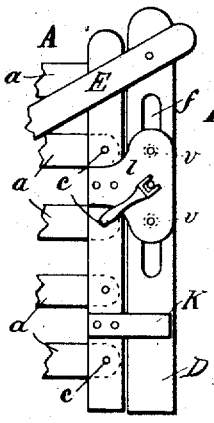
Fig. 6.
Fig. 5.
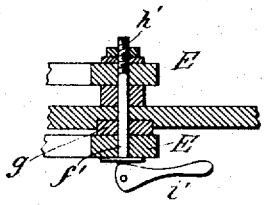
Fig. 3.
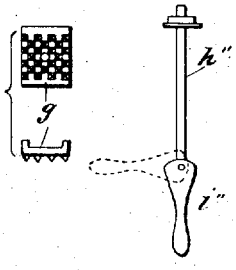
Fig. 4.
WITNESSES:
W. H. Colton
Minnie C. Smith
INVENTOR.
Israel L. Landis
BY
Fred A. Bowersock ATTORNEY.

UNITED STATES PATENT OFFICE.

ISRAEL L. LANDIS, OF CHICAGO, ILLINOIS.

GATE.

SPECIFICATION forming part of Reissued Letters Patent No. 12,039, dated September 30, 1902.

Original No. 680,417, dated August 13, 1901. Application for reissue filed June 23, 1902. Serial No. 112,944.

*To all whom it may concern:*

Be it known that I, ISRAEL L. LANDIS, a citizen of the United States, residing at Chicago, in the county of Cook and State of Illinois, have invented certain new and useful Improvements in Gates, of which the following is a specification.

This invention relates to improvements in swinging gates; and the object of my invention is the construction of a comparatively simple gate-frame capable of a variety of different forms of adjustment. My improved gate is adapted to be used on level ground or on hillsides and may be bodily raised or lowered and retained in the raised or lowered position to pass snow-drifts or to let small stock pass under, while closed for large stock; and my invention consists in the various details of construction and in combinations of parts, all as hereinafter described, and particularly pointed out in the claims.

My invention will be more readily understood by reference to the accompanying drawings, forming a part of this specification, and in which—

Figure 1 is a side elevation of a gate embodying my invention. Fig. 2 is an enlarged sectional view of a preferred form of the rear guide-plates and clamping device. Fig. 3 is an enlarged sectional view of a preferred form of clamping device designed to give rigidity to the frame. Figs. 4 and 5 are details. Fig. 6 shows a modification of the form of rear clamping device and connections.

Referring now to the drawings in detail, the gate A preferably comprises a frame of wooden bars or rails *a* and the common upright battens B, connected by bolts or pins *c*, as in ordinary gates. At the rear end of the gate is a subpost D, which is provided with a longitudinal and transverse slot *f*. The subpost D is preferably connected to the gate A at the rear uprights or battens B by means of the clamping device shown in cross-section at Fig. 2 and subsequently described in detail. The hinges R are attached to this subpost. Braces E are pivotally bolted to the upper end of this subpost, one on each side, and are provided with longitudinal slots at their lower ends. These braces pass diagonally down to one of the lower rails at the front end of the gate, where they are adjustably secured, preferably by means of the guide-pin and clamping device shown in detail in Fig. 3. This clamping device comprises a bolt *h*, passing through a washer and through the slot *f'* in the brace E. Between this brace and the rail *a* is preferably interposed the roughened friction-plate *g*, which is provided with a hole in the center for the bolt *h'*, which passes through the batten B and the slotted brace E on the opposite side. One end of this bolt *h'* has a nut and washer and the other end preferably the cam-lever *i'* and a washer, by means of which these parts are rigidly clamped together. The roughened friction-plate *g* prevents the brace E from slipping when the gate is adjusted and locked. If the lever *i'* works too loosely, the nut on the bolt *h'* may be tightened up to produce enough pressure or force on the clamp to hold the gate into adjusted position. If it is desired to raise or lower the end of the gate, the cam-lever *i'* is released and the gate adjusted as desired and secured or clamped by again operating the lever *i'*. In this manner the front end of the gate can be instantly adjusted to prevent dragging of the gate and breaking it or to pass over snow or for hillsides or to permit small stock to pass under.

The clamping device which secures the subpost D to the gate A preferably consists in two perforated guide-plates *l l*, secured to the rear uprights B B on opposite sides of the rear end of the gate at about the middle of the same and extending rearwardly to embrace the subpost D. The clamping-bolt *h* passes through these plates and through the slot *f* in subpost D. This bolt preferably passes through a coiled-wire spring *n*, interposed between these perforated plates *l l*, the ends of the spring resting against and tending to force apart the plates *l l*, so that they will not bind against the subpost when it is desired to bodily raise or lower the gate.

Around the spring *n* is a loose hollow anti-friction-roller *v*, somewhat shorter than said spring. This roller *v* works freely over the spring and serves to ease the raising or lowering of the gate on the subpost. This roller being shorter than the thickness of the subpost D revolves freely and does not interfere with binding the clamping-plates *l l* to the subpost. When it is desired to raise or lower the whole gate, the locking cam-lever on the slotted braces E and that on the slotted subpost D, are loosened and the whole gate is vertically adjustable. The rear end is raised or lowered to the desired height and locked by turning down the cam-lever *i*, the front end being subsequently correspondingly adjusted and clamped by means of the cam-lever *i'*.

I have shown a latch *x*, preferably a sliding wooden bar, lying on the middle rail *a* and passing between the front end battens B and the second batten B and the plate Z. This plate Z is also preferably provided with a cam-lever *i''* and bolt *h''*, Fig. 4, or with a bolt and thumb-nut, by which means the latch is securely held and locked, so that the latch may not be opened by stock rubbing against it or by any chance mishap.

In Fig. 6 I have shown the plate *l* wider at the rear part and two rollers *v v* in the slotted post. (Shown by dotted lines.) The bolt *h* and the spring *n* in the slot of the subpost are the same as shown in Fig. 2. The two small guide-plates K serve to steady the gate when the same is raised or lowered at the rear end.

It is thus seen that my gate is simple in construction, easy in operation, and cheap in cost. Its mechanical features are firm and effective. I have minutely described many of the minor details, many modifications of which details will doubtless readily suggest themselves to those skilled in the art, and I therefore do not desire to limit my invention to the specific construction herein shown and described.

Having thus described my invention, I claim as new and desire to secure by Letters Patent—

1. In a gate, the combination with the frame of a transversely-slotted subpost suitably hinged to the main supporting-post and carrying said frame, a pair of straps attached to the supporting-battens of said frame and projecting over and slidable against the lateral faces of said subpost, and a rod connecting said straps, extending through said slot and slidable therein, and provided with means for clamping said straps against said subpost.

2. In a gate, the combination with an adjustable frame of a transversely-slotted subpost to carry said frame, a pair of guide and clamping plates attached to the supporting-battens of said frame and projecting over the lateral faces of said subpost, and a rod extending through said slot, connecting said plates and provided with means for clamping said plates against said subpost.

3. In a gate, the combination with a frame the members of which are pivotally connected with each other to permit of an oblique as well as a rectangular configuration of said frame, of a transversely-slotted subpost to carry said frame, a pair of straps attached to the supporting-battens of said frame and projecting over and slidable against the lateral faces of said subpost, and a rod extending through said slot, slidable therein and provided with means for clamping said straps against said subpost.

4. In a gate, the combination with a frame the members of which are pivotally connected with each other of a transversely-slotted subpost to carry said frame, clamping-plates attached to said frame and projecting over the lateral faces of said subpost, a rod extending through said slot, connecting said plates and provided with means for clamping said plates against said subpost, a diagonal brace pivotally attached at one end to the top of said subpost and slotted at its other end, and a guide-pin upon said frame extending through said slot and provided with means for clamping said brace and frame.

5. In a gate, the combination with the transversely-slotted subpost of the adjustable frame, clamping-plates attached to said frame and slidable against the lateral faces of said subpost, means operable through the slot to clamp said plates against the subpost, the diagonal bracing-arm pivotally attached to the top of said subpost, means for clamping said arm and frame to give rigidity to said frame, the sliding latch-bolt, and means for clamping said latch-bolt and frame.

In testimony of the foregoing I have hereunto set my hand, this 31st day of May, 1902, in the presence of two subscribing witnesses.

ISRAEL L. LANDIS.

Witnesses:
MINNIE B. SNITKOFF,
J. E. STUBBS.